United States Patent
Kane et al.

(10) Patent No.: US 8,870,214 B2
(45) Date of Patent: Oct. 28, 2014

(54) CHILD STROLLER APPARATUS

(75) Inventors: Schantal M. Kane, Downingtown, PA (US); Curtis M. Hartenstine, Birdsboro, PA (US); Robert E. Haut, West Chester, PA (US)

(73) Assignee: Wonderland Nurserygoods Company Limited, Hong Kong (HK)

( * ) Notice: Subject to any disclaimer, the term of this patent is extended or adjusted under 35 U.S.C. 154(b) by 256 days.

(21) Appl. No.: 13/299,481

(22) Filed: Nov. 18, 2011

(65) Prior Publication Data

US 2012/0126512 A1 May 24, 2012

Related U.S. Application Data

(60) Provisional application No. 61/458,169, filed on Nov. 18, 2010, provisional application No. 61/462,368, filed on Feb. 1, 2011.

(51) Int. Cl.
| | |
|---|---|
| *B62B 7/00* | (2006.01) |
| *B62B 7/06* | (2006.01) |
| *B62B 7/08* | (2006.01) |
| *B62B 9/26* | (2006.01) |

(52) U.S. Cl.
CPC . *B62B 7/062* (2013.01); *B62B 7/08* (2013.01); *B62B 2205/24* (2013.01); *B62B 7/064* (2013.01); *B62B 9/26* (2013.01)
USPC .......... 280/647; 280/642; 280/650; 280/658; 280/47.38; 280/47.41

(58) Field of Classification Search
USPC ............ 280/642, 647, 650, 658, 47.38, 47.4, 280/47.41
See application file for complete search history.

(56) References Cited

U.S. PATENT DOCUMENTS

| | | | | |
|---|---|---|---|---|
| 4,544,178 A | * | 10/1985 | Al-Sheikh et al. | 280/642 |
| 4,614,454 A | * | 9/1986 | Kassai | 403/62 |
| 5,775,460 A | * | 7/1998 | Stone | 182/22 |
| 6,036,220 A | | 3/2000 | Zhen | |
| 6,095,548 A | | 8/2000 | Baechler | |
| 6,102,431 A | * | 8/2000 | Sutherland et al. | 280/642 |
| 6,991,248 B2 | | 1/2006 | Valdez et al. | |
| 7,077,420 B1 | | 7/2006 | Santoski | |
| 7,237,795 B2 | * | 7/2007 | Wu | 280/651 |
| 2006/0082104 A1 | * | 4/2006 | Wun | 280/650 |
| 2007/0090628 A1 | | 4/2007 | Golias | |
| 2008/0211206 A1 | | 9/2008 | Thorne et al. | |
| 2008/0258436 A1 | | 10/2008 | Storm | |
| 2011/0181024 A1 | * | 7/2011 | Chicca | 280/642 |

FOREIGN PATENT DOCUMENTS

| | | |
|---|---|---|
| CN | 201037002 Y | 3/2008 |
| CN | 201052784 Y | 4/2008 |

* cited by examiner

*Primary Examiner* — Hau Phan
*Assistant Examiner* — Bryan Evans
(74) *Attorney, Agent, or Firm* — David I. Roche; Baker & McKenzie LLP

(57) ABSTRACT

A child stroller apparatus includes first and second leg frames, a handle and a latch element. The first leg frame includes a first side segment affixed with a first coupling element. The second leg frame includes a second side segment affixed with a second coupling element that is pivotally connected with the first coupling element about a first pivot axis. The handle includes a third side segment affixed with a third coupling element that is pivotally connected with the first coupling element about a second pivot axis. The latch element is operable to move between a locked position where the latch element locks the first, second and third coupling elements together to hold the handle and the first and second leg frames in a deployed state, and an unlocked position to allow relative rotations between the handle and the first and second leg frames to collapse the stroller apparatus.

24 Claims, 12 Drawing Sheets

CHILD STROLLER APPARATUS

CROSS-REFERENCE TO RELATED APPLICATION(S)

This application claims priority to U.S. Provisional Patent Application No. 61/458,169 filed on Nov. 18, 2010, and to U.S. Provisional Patent Application No. 61/462,368 filed on Feb. 1, 2011.

BACKGROUND OF THE INVENTION

1. Field of the Invention

The present invention relates to child stroller apparatuses, and more particularly to collapsible child stroller apparatuses.

2. Description of the Related Art

Caregivers usually rely on a stroller apparatus to facilitate transporting small children while walking. A stroller apparatus is typically constructed from a metal frame that comprises the assembly of metal and plastic parts, and a fabric element that connects or wraps around the metal frame. When it is unused, the stroller apparatus can be folded and collapsed for convenient storage or transport. The construction adopted for folding the stroller apparatus plays an important role in the design of the stroller since it has to be safe and convenient to handle in different situations. For example, certain situations require that the stroller apparatus can stand upright in the collapsed state. Other situations require that the stroller apparatus can be conveniently folded and carried with one hand.

Therefore, there is a need for an improved child stroller apparatus that can be convenient to fold and address at least the foregoing issues.

SUMMARY

In some embodiment, the present application describes a child stroller apparatus that can include a first leg frame, a second leg frame, a handle and a latch element. The first leg frame includes a first side segment affixed with a first coupling element. The second leg frame includes a second side segment affixed with a second coupling element that is pivotally connected with the first coupling element about a first pivot axis. The handle includes a third side segment affixed with a third coupling element that is pivotally connected with the first coupling element about a second pivot axis spaced apart from the first pivot axis. The latch element is operable to move between a locked position where the latch element locks the first, second and third coupling elements together to hold the handle and the first and second leg frames in a deployed state, and an unlocked position to allow rotation of the first leg frame about the first pivot axis relative to the second leg frame, and rotation of the handle about the second pivot axis relative to the first leg frame to turn the child stroller apparatus to a collapsed state.

In other embodiments, the child stroller apparatus can include a first leg frame, a second leg frame, a handle, a latch element and a housing. The first leg frame includes a first side segment affixed with a first coupling element. The second leg frame includes a second side segment affixed with a second coupling element, the second coupling element being assembled with the first coupling element via a first pivot connection that defines a first pivot axis. The handle includes a third side segment affixed with a third coupling element, the third coupling element being assembled with the first coupling element via a second pivot connection that defines a second pivot axis spaced apart from the first pivot axis. The assembly of the first, second and third coupling elements is such that rotational displacements of the handle and the second leg frame are linked with each other. The latch element is operable to lock the first, second and third coupling elements in a deployed state. The housing is adapted to enclose at least partially the latch element and the first and second pivot connections.

In yet other embodiments, the child stroller apparatus can include a front leg frame, a rear leg frame assembled with the front leg frame via a first pivot connection, a handle assembled with the rear leg frame via a second pivot connection, and a latch element pivotally mounted with the rear leg frame, the latch element being operable to releasably lock the handle, the front leg frame and the rear leg frame in a deployed state.

The foregoing is a summary and shall not be construed to limit the scope of the claims. The operations and structures disclosed herein may be implemented in a number of ways, and such changes and modifications may be made without departing from this invention and its broader aspects. Other aspects, inventive features, and advantages of the invention, as defined solely by the claims, are described in the non-limiting detailed description set forth below.

DETAILED DESCRIPTION OF THE EMBODIMENTS

Figure 1:
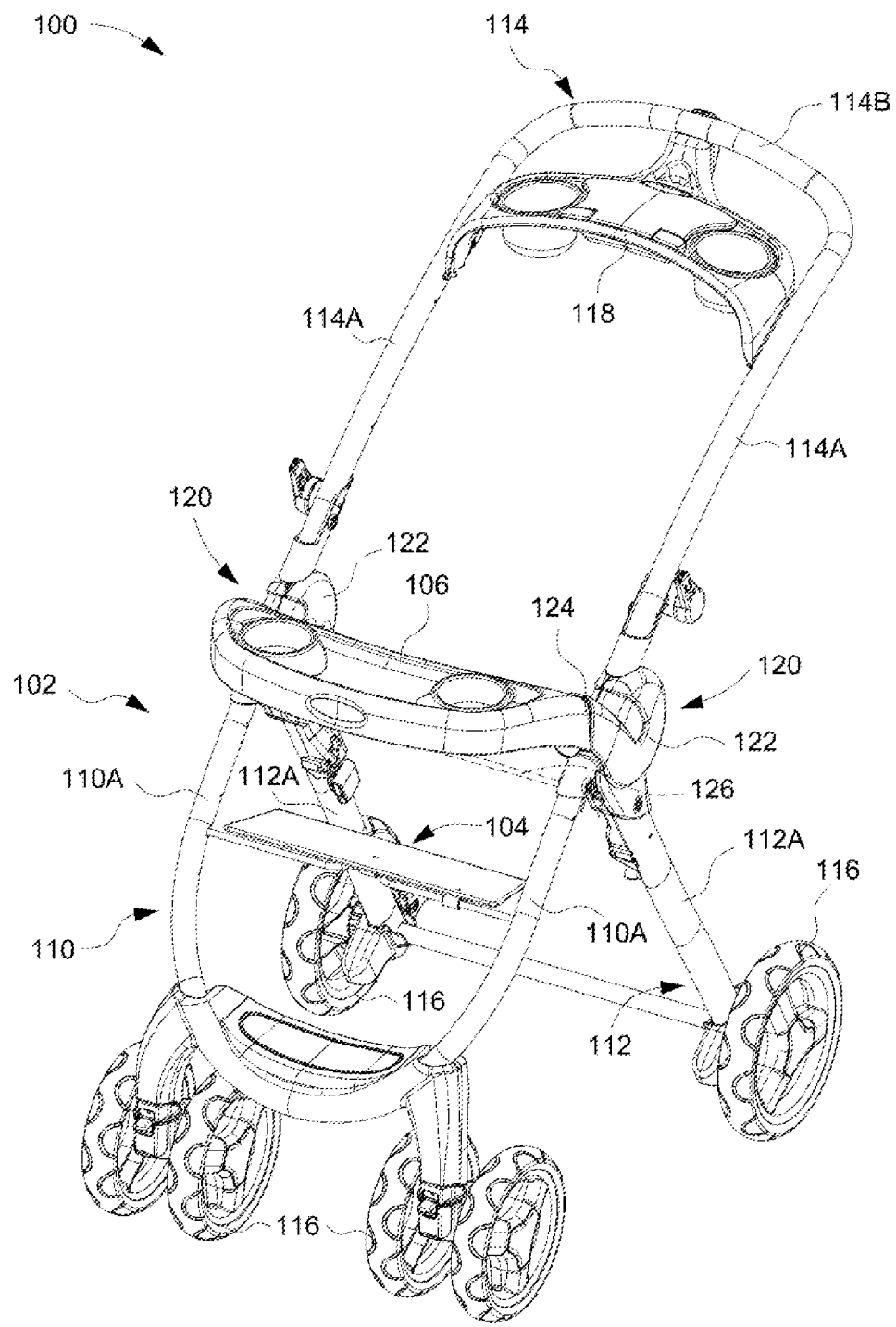
FIG. 1 is a front perspective view illustrating an embodiment of a child stroller apparatus.
Figure 2:
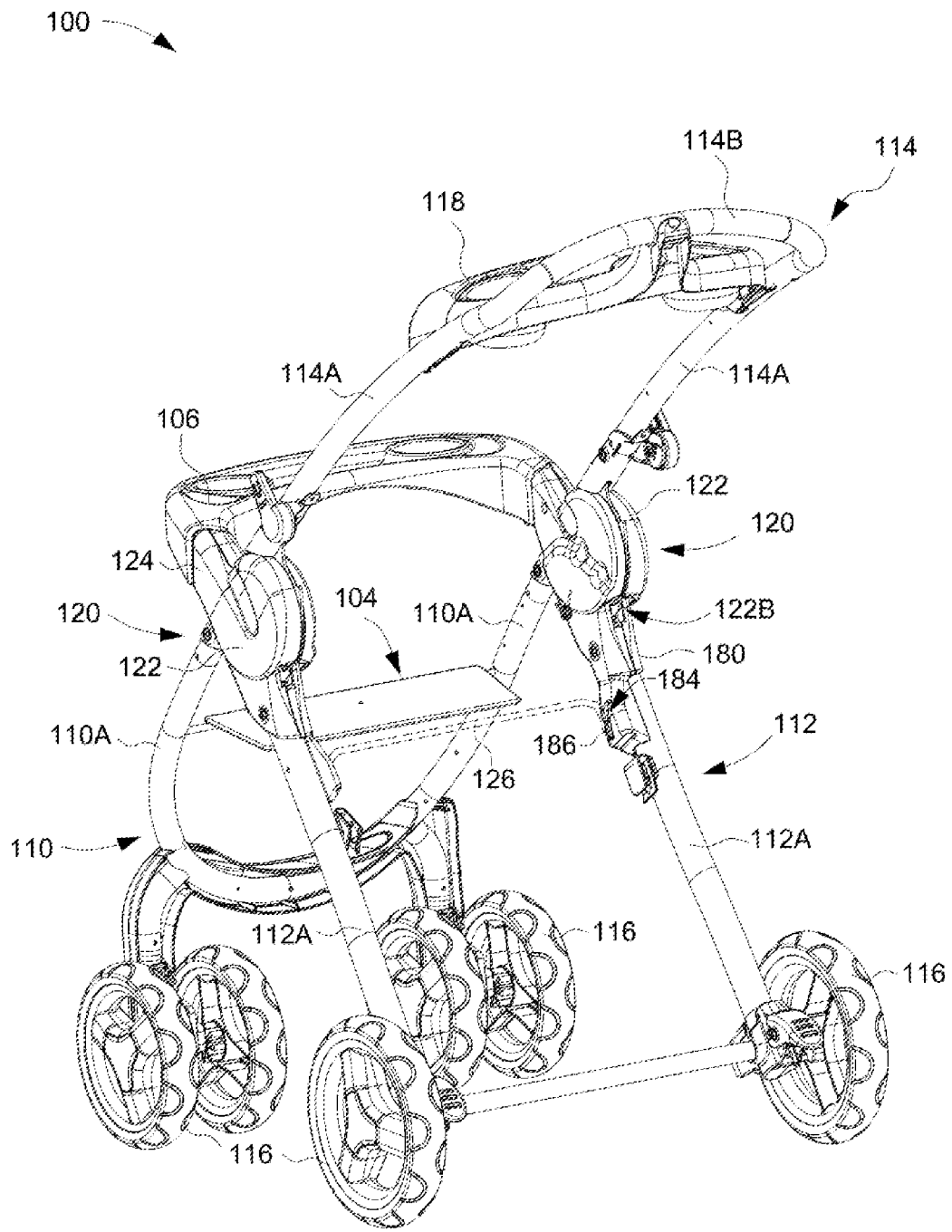
FIG. 2 is a rear perspective view of the child stroller apparatus shown in FIG. 1.

FIGS. 1 and 2 are front and rear perspective views illustrating an embodiment of a child stroller apparatus 100. The child stroller apparatus 100 can include a support frame 102, and a seat 104 and front guard device 106 respectively mounted with the support frame 102. In this embodiment, the front guard device 106 is a tray.

The support frame 102 can include a first leg frame 110, a second leg frame 112 and a handle 114. The first and second leg frames 110 and 112 can be respectively front and rear leg frames formed from the assembly of one or more tubular segments. Each of the first and second leg frames 110 and 112 can have left and right side segments (respectively shown as 110A for the left and right side segments of the first leg frame 110, and 112A for the left and right side segments of the second leg frame 112).

The handle 114 can be formed from the assembly of one or more tubular segments having a generally U-shape comprised of left and right side segments 114A, and a transverse segment 114B connected between the side segments 114A. Lower ends of the first and second leg frames 110 and 112 can be respectively provided with a plurality of wheels 116. A tray 118 may be connected between the side segments 114A of the handle 114 at an elevated position for the adult's use.

The left side segment 110A of the first leg frame 110 and the left side segment 112A of the second leg frame 112 can have upper end portions respectively assembled with a lower end portion of the left side segment 114A of the handle 114 via a joint structure 120. Likewise, the right side segment 110A of the first leg frame 110 and the right side segment 112A of the second leg frame 112 can have upper end portions respectively assembled with a lower end portion of the right side segment 114A of the handle 114 via a joint structure 120. Each of the joint structures 120 can be outwardly enclosed with a housing 122 that has a front extension 124 to which the front guard device 106 is securely affixed.

The joint structures 120 can pivotally assemble the first and second leg frames 110 and 112 and the handle 114, so that they can rotate relative to one another to collapse or deploy the support frame 102. In addition, each of the joint structures 120 can include a latch element 176 (better shown in FIG. 3) that is operable to lock the handle 114 and the first and second leg frames 110 and 112 in either of a deployed state for use, or a collapsed state for convenient storage. As shown in FIGS. 1 and 2, in the deployed state, the side segments 110A of the first leg frame 110 and the side segments 114A of the handle 114 can extend substantially in a same inclined direction. Moreover, the side segments 112A of the second leg frame 112 can extend at an angle from the side segments 110A of the first leg frame 110 to provide stable standing of the child stroller apparatus 100.

To unlock the latch elements, an actuator element 126 may be provided at a location adjacent to the seat 104. In one embodiment, the actuator element 126 can be made of a flexible material, such as a fabric element, strap, cord, and the like. The actuator element 126 can extend across a width between the left and right side segments 112A of the second leg frame 112, and have two opposite end portions respectively connected with the latch elements 176 (better shown in FIG. 3) provided in the joint structures 120. The actuator element 126 can be pulled up to unlock the latch elements 176 concurrently, and then raise the entire support frame 102 so that the handle 114 and the first and second leg frames 110 and 112 can rotate under gravity action to collapse the stroller apparatus 100.

Figure 3:
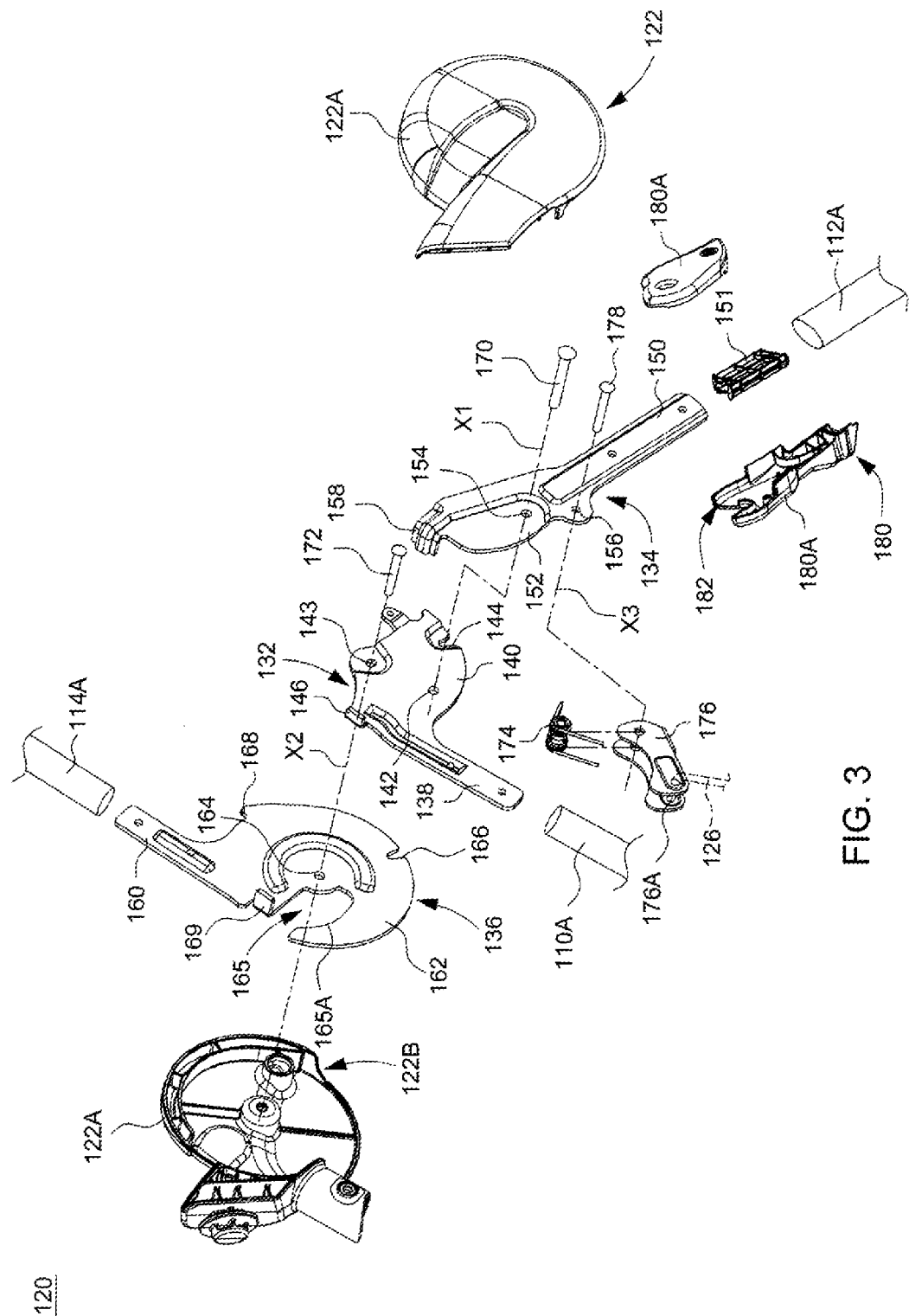
FIG. 3 is an exploded view illustrating the construction of a joint structure used in the child stroller apparatus.

FIG. 3 is an exploded view illustrating an embodiment of the joint structure 120 implemented to assemble one side segment 114A of the handle 114 and side segments 110A and 112A of the first and second leg frames 110 and 112. As shown, a first coupling element 132 can be affixed with an upper end portion of the side segment 110A of the first leg frame 110, a second coupling element 134 can be affixed with an upper end portion of the side segment 112A of the second leg frame 112, and a third coupling element 136 can be affixed with a distal or lower end portion of the side segment 114A of the handle 114. In one embodiment, the coupling elements 132, 134 and 136 can be exemplary formed as metallic plates.

The first coupling element 132 can include an extension 138, and a plate portion 140 connected with the extension 138. The extension 138 can be inserted through the associated side segment 110A of the first leg frame 110 and securely affixed therewith, whereas the plate portion 140 is positioned outside the side segment 110A. The first coupling element 132 can also include two holes 142 and 143 formed spaced apart from each other through the plate portion 140, a locking groove 144 cut at a peripheral edge of the plate portion 140, and a tab 146 projecting from a side of the plate portion 140. The locking groove 144 and the tab 146 can be placed on two approximately opposite sides of the plate portion 140 relative to the positions of the holes 142 and 143. The tab 146 may be formed as a bent tab that projects approximately perpendicular to the plate portion 140.

The second coupling element 134 can include an extension 150, and a plate portion 152 connected with the extension 150. The extension 150 can be inserted through the associated side segment 112A of the second leg frame 112 and securely affixed therewith, whereas the plate portion 152 is located outside the side segment 112A. In one embodiment, an adapter element 151 may be provided to facilitate the mount of the extension 150 through the side segment 112A. In addition, the second coupling element 134 can include two holes 154 and 156 formed through the plate portion 152 at spaced-apart positions, and a tab 158 projecting from a distal end of the plate portion 152 toward the plate portion 140 of the first coupling element 132. The tab 158 may be formed as a bent tab that projects approximately perpendicular to the plate portion 152.

The third coupling element 136 can include an extension 160, and a plate portion 162 connected with the extension 160 and having at least partially a rounded contour. The extension 160 can be inserted through the associated side segment 114A of the handle 114 and securely affixed therewith, whereas the plate portion 162 is located outside the side segment 114A. The third coupling element 134 can also include a hole 164 formed through the plate portion 162, a slot 165 formed through the plate portion 162 and opened at a peripheral edge thereof, and a locking groove 166 and a stop 168 respectively formed at spaced-apart positions on a rounded peripheral edge of the plate portion 162. The slot 165 can extend from a periphery of the plate portion 162 toward the hole 164, and include an inner edge that defines a cam surface 165A. A side of the plate portion 162 can also be provided with a tab 169 projecting toward the plate portion 140 of the first coupling element 132. In one embodiment, the tab 169 may be formed as a bent tab that projects approximately perpendicular to the plate portion 162. The tab 169 can be arranged near the opening of the slot 165, approximately on a lengthwise direction of the extension 160.

Figure 4:
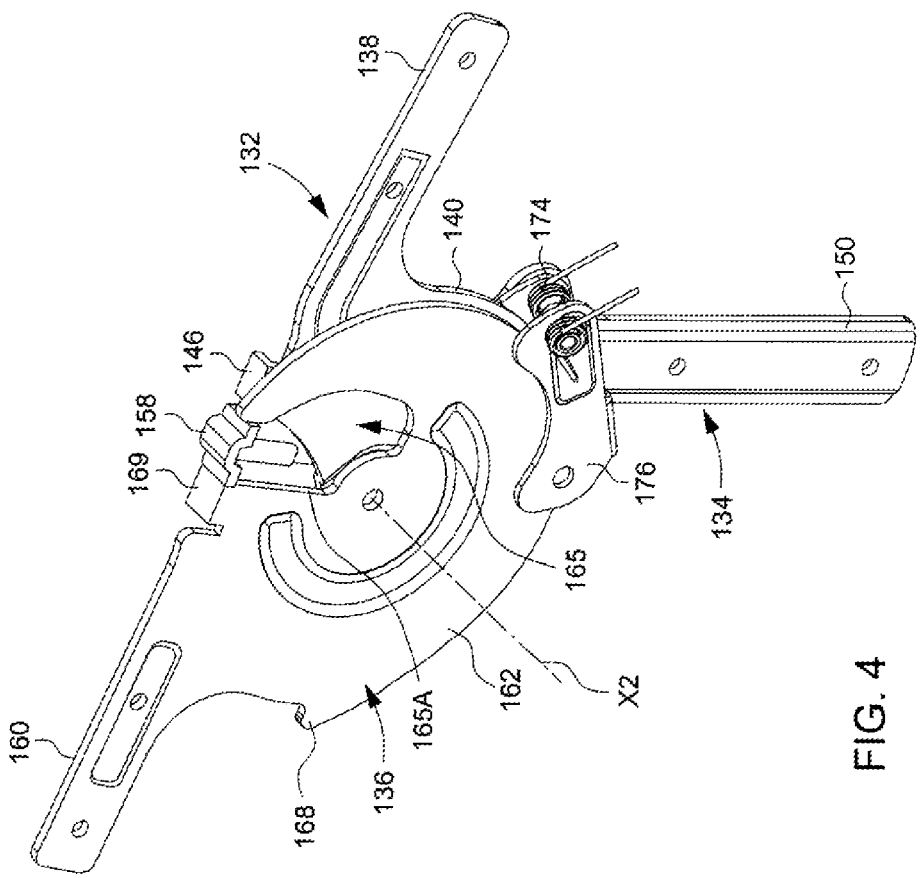
FIG. 4 is a schematic view illustrating the assembly of three coupling elements and a latch element in the joint structure.

FIG. 4 is a schematic view illustrating the assembly of the coupling elements 132, 134 and 136. The first, second and third coupling elements 132, 134 and 136 can be assembled adjacent to one another, the first coupling element 132 being disposed between the second and third coupling elements 134 and 136. A pivot connection 170 (e.g., shaft, pin, rivet and the like) can be passed through the holes 142 and 154 to pivotally connect the first and second coupling elements 132 and 134 about a first pivot axis X1. Another pivot connection 172 (e.g., shaft, pin, rivet and the like) can be passed through the holes 143 and 164 to pivotally connect the first and third coupling element 132 and 136 about a second pivot axis X2 parallel to the first pivot axis X1. In this manner, the first and second leg frames 110 and 112 can be pivotally connected together via the pivot connection 170 and rotate relative to each other about the pivot axis X1, whereas the first leg frame 110 and the handle 114 can be pivotally connected together via the pivot connection 172 and rotate relative to each other about the pivot axis X2. Once the coupling elements 132, 134 and 136 are pivotally assembled together, the locking grooves 144 and 166 are disposed radially apart from the second pivot axis X2. Moreover, the radial distance between the tab 146 and the pivot axis X2 is the same or substantial equal to the radial distance between the tab 169 and the pivot axis X2, and the radial distance between the tab 158 and the pivot axis X1 may be greater than the respective radial distances between the pivot axis X2 and the tabs 146 and 169. The tab 158 can extend past the plate portion 140 of the first coupling element 132 into the area of the slot 165 through the third coupling element 136. The tab 158 thereby mounted can interact with the cam surface 165A of the slot 165 to operatively link the rotational displacements of the second leg frame 112 and the handle 114. In other words, a rotational displacement of the handle 114 can concurrently drive rotational displacement of the second leg frame 112, and reciprocally. This construction can facilitate displacements of the handle 114 and the second leg frame 112 in parallel relative to the first leg frame 110.

Referring to FIGS. 3 and 4, the joint structure 120 can also include a lock mechanism that is comprised of a spring 174, and a latch element 176 movably assembled relative to the first, second and third coupling elements 132, 134 and 136. In one embodiment, a pivot connection 178 (e.g., shaft, pin or rivet) can be passed through the latch element 176 and the hole 156 to pivotally connect the latch element 176 with the second coupling element 134 about a third pivot axis X3 parallel to the pivot axes X1 and X2. The latch element 176 can be thereby pivotally assembled with the second leg frame 112 in a straddling position relative to the plate portions 140 and 162 of the first and third coupling elements 132 and 136. Moreover, a distal end portion of the latch element 176 opposite to the position of the pivot connection 178 can be provided with a pin 176A adapted to engage with the locking grooves 144 and 166 of the first and third coupling elements 132 and 136, or the stop 168 of the third coupling element 136.

The spring 174 can be a torsion spring configured to rotationally bias the latch element 176 toward a locking position engaged with the first and third coupling elements 132 and 136 (e.g., with the locking grooves 144 and 166) to lock the support frame 102 in the deployed state, or with the stop 168 to hold the support frame 102 in a collapsed state.

The actuator element 126 can have a portion affixed with the latch element 176, and can be guided to extend outside the joint structure 120. As it is connected with the latch element 176, the actuator element 126 can be viewed as being mounted with the second leg frame 112. A pulling action applied on the actuator element 126 can drive the latch element 176 to rotate about the pivot axis X3 in a direction that loads the spring 174 and releases the locking engagement of the latch element 176 with the first and third coupling elements 132 and 136.

Referring to FIGS. 1-3, a sleeve element 180 comprised of two cover halves 180A can be affixed with the side segment 112A of the second leg frame 112. The sleeve element 180 can include a pocket 182 in which the assembly of the first, second and third coupling elements 132, 134 and 136, in particular the plate portions 140, 152 and 162 thereof, can be at least partially received. As better shown in FIGS. 2 and 9, an inner side of the sleeve element 180 (i.e., located on an inner side of the support frame 102 adjacent to the seat 104) can include an opening 184 where is mounted a pulley 186. The opening 184 and the pulley 186 may be placed at a position below an upper support surface of the seat 104. The actuator element 126 can extend from the latch element 176 downward along an interior of the sleeve element 180, wrap around the pulley 186 and travel through the opening 184, and then extend upwardly through an opening of the seat 104 (not shown) for convenient operation and across the width of the stroller apparatus 100 to joint with the latch element 176 in a same manner on the other side.

As shown in FIGS. 2 and 3, a housing 122 comprised of two cover halves 122A can be affixed with the side segment 110A of the first leg frame 110 to at least partially enclose the first, second and third coupling elements 132, 134 and 136, the latch element 176 and a portion of the sleeve element 180. In particular, the housing 122 can include a cylindrically shaped casing in which the assembly of the plate portions 140, 152 and 162 with the pivot connections 170 and 172 and the latch element 176 can be received and at least partially enclosed. The housing 122 can also define an opening 122B for passage of the side segment 112A of the second leg frame 112. The opening 122B can have an elongated shape along which the side segment 112A of the second leg frame 112 can move when the support frame 102 is folded or unfolded.

Figure 5:
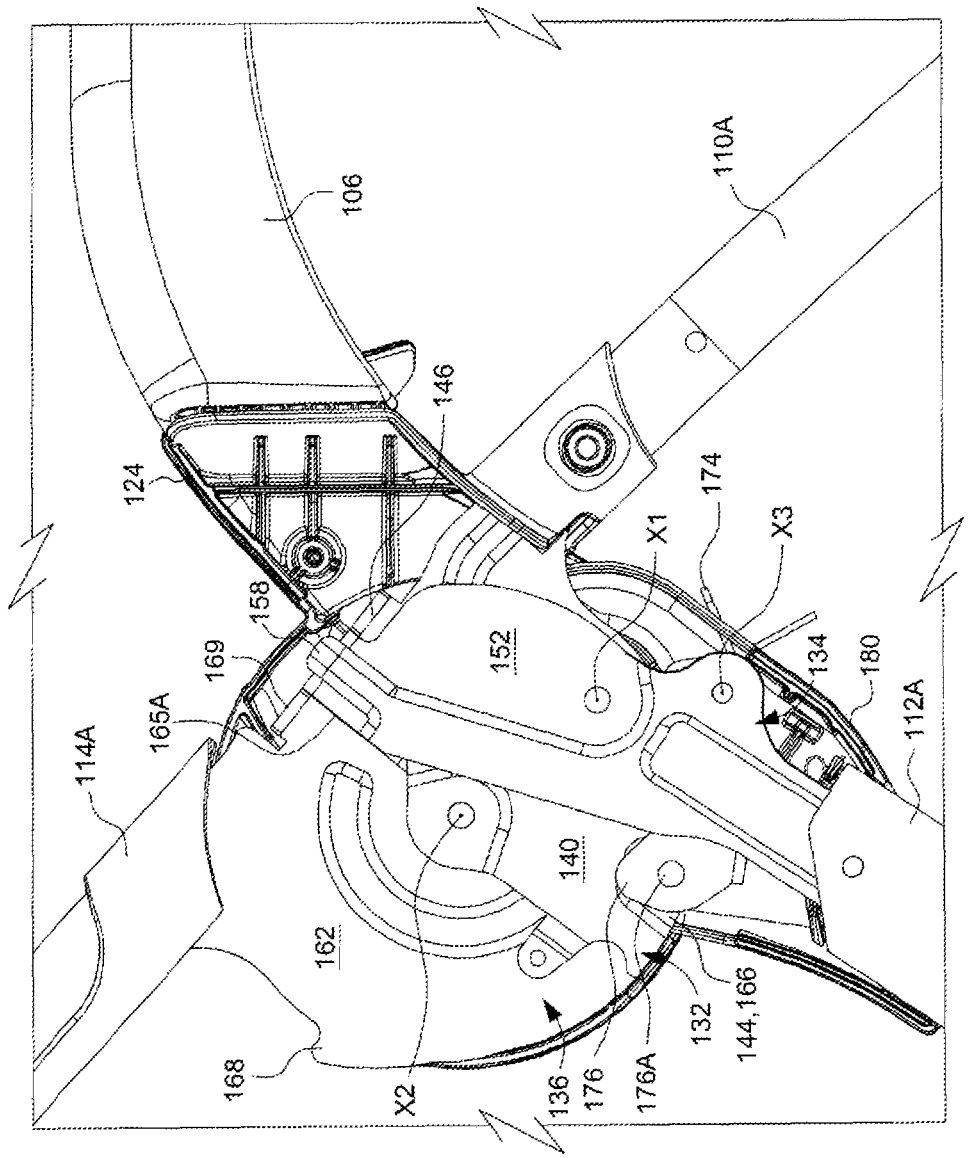
FIGS. 5 and 6 are schematic enlarged views illustrating an operation of the joint structure.
Figure 6:
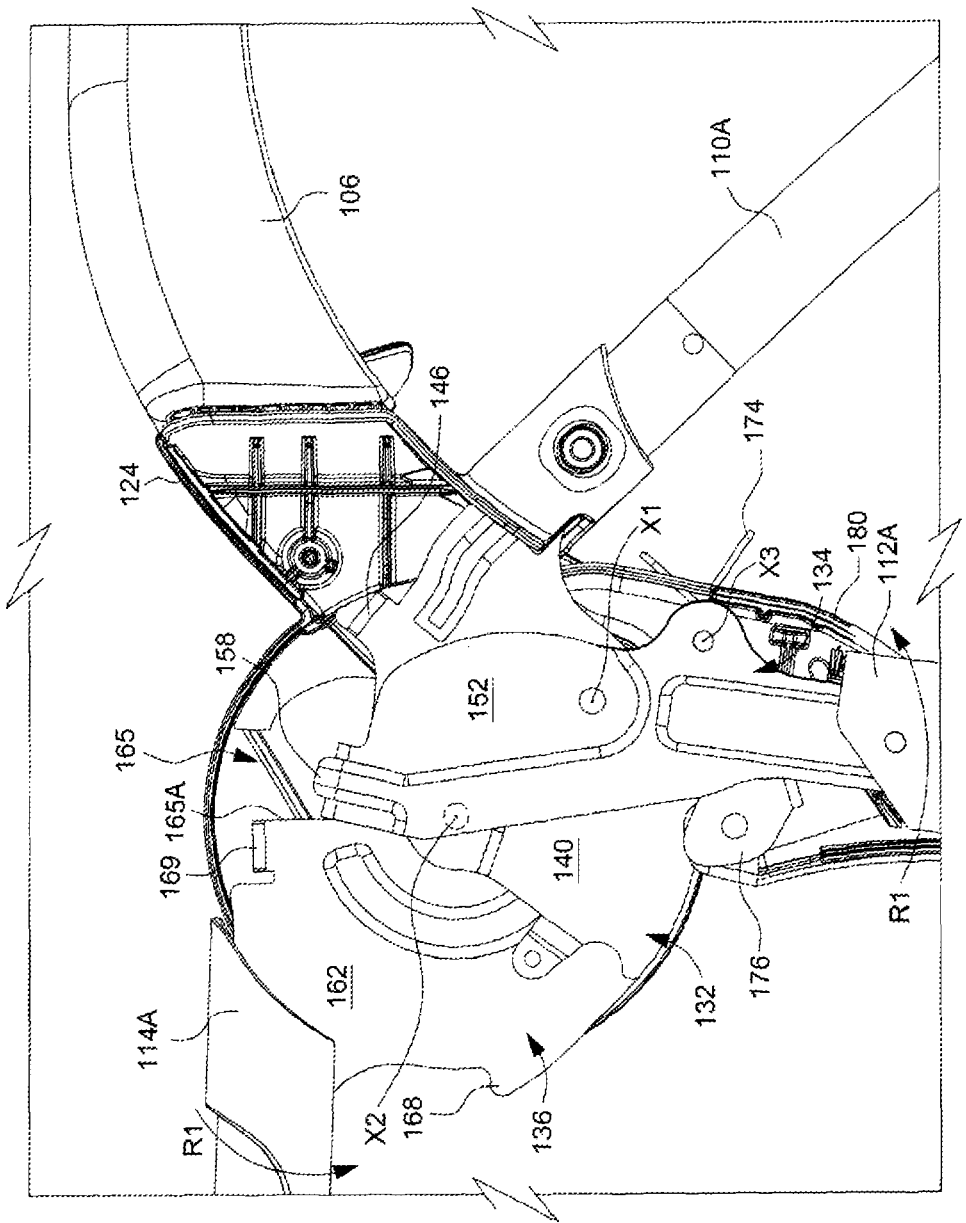

In conjunction with FIGS. 1-4, FIGS. 5 and 6 are schematic enlarged views illustrating an operation of the joint structure 120. For the sake of clarity, only certain parts of the joint structure 120 (including the first, second and third coupling elements 132, 134 and 136) are illustrated in FIGS. 5 and 6. The side of the joint structure 120 shown in FIGS. 5 and 6 is opposite to that shown in FIG. 4.

As shown in FIG. 5, when the stroller apparatus 100 is unfolded in the deployed state, the side segment 110A of the first leg frame 110 and the side segment 114A of the handle 114 can extend substantially in a same direction. Moreover, the tabs 146, 158 and 169 can be approximately aligned with one another in the direction of extension of the side segments 110A and 114A, the tab 158 being located between and in contact with the tabs 146 and 169. In this configuration, the tab 158 can be located adjacent to the opening of the slot 165 on the peripheral edge of the third coupling element 136. In addition, the pin 176A of the latch element 176 biased by the spring 174 can engage with the locking grooves 144 and 166 aligned with each other. The handle 114 and the first and second leg frames 110 and 112 of the support frame 102 can be thereby held in the deployed state for use.

FIG. 6 is a schematic view illustrating the joint structure 120 in an intermediary stage during a folding operation. To collapse the support frame 102, a pulling action can be applied on the actuator element 126 (better shown in FIGS. 1 and 2) to drive the latch element 176 in rotation about the pivot axis X3 to disengage from the locking grooves 144 and 166. The actuator element 126 then can be further pulled upward to raise the stroller apparatus 100 above the ground. As a result, the handle 114, and the first and second leg frames 110 and 112 can freely rotate relative to one another about the pivot axes X1 and X2 by gravity action. For example, the second leg frame 112 and the handle 114 can rotate in a same direction R1 relative to the first leg frame 110 to fold over one another. As the support frame 102 is folding, the tabs 146, 158 and 169 can move away from one another. In particular, the tab 158 on the second coupling element 134 can be in contact with and follow the cam surface 165A to travel through the interior of the slot 165, and the stop 168 on the third coupling element 136 can rotationally move toward the latch element 176.

Once the collapsed state is reached, the actuator element 126 (better shown in FIGS. 1 and 2) can be released, and the latch element 176 biased by the spring 174 can engage with the stop 168 on the third coupling element 136 to block reverse rotation of the handle 114. In one embodiment, the stop 168 can be formed as a projecting hook adapted to catch the pin 176A of the latch element 176 to stop reverse rotation of the handle 114. In alternate embodiments, the stop 168 can also be formed as a recessed groove, e.g., similar to any of the locking grooves 144 and 166. Accordingly, the latch element 176 can securely keep the support frame 102 in the collapsed state.

Once it is collapsed, the stroller apparatus 100 can be placed in a standing position on the ground surface. Alternatively, the actuator element 126 can also be grasped with one hand to carry the stroller apparatus 100 in the collapsed state.

When the use of the stroller apparatus 100 is needed, a pulling action can be applied on the actuator element 126 to cause the latch element 176 to disengage from the stop 168. The handle 114, and the first and second leg frames 110 and 112 then can be unfolded by rotation about the pivot axes X1 and X2. As the support frame 102 is unfolding, the tab 158 on the second coupling element 134 can follow the cam surface 165A and travel in a direction for exiting the slot 165. Once the deployed state is reached, and the tabs 146, 158 and 169 can be aligned adjacent to one another. In particular, the tab 158 of the second coupling element 134 can contact with the tabs 146 and 169 of the first coupling element 132 and the third coupling element 134 to stop further rotations of the handle 114 and the first and second leg frames 110 and 112. Meanwhile, the spring 174 can urge the latch element 176 to engage with the locking grooves 144 and 166 that are aligned with each other to lock the stroller apparatus in the deployed state.

While the aforementioned description provides embodiments in which a same integrated lock mechanism is used to hold the stroller apparatus in the deployed and collapsed states, alternate embodiments may also provide a separate storage lock that can independently lock the collapsed state of the stroller apparatus. When the stroller apparatus is in the collapsed state, the separate storage lock can create an interference that prevents the stroller apparatus from unfolding from the collapsed state to the deployed state. Examples of separate storage locks are described hereafter with reference to FIGS. 7-12.

Figure 7:
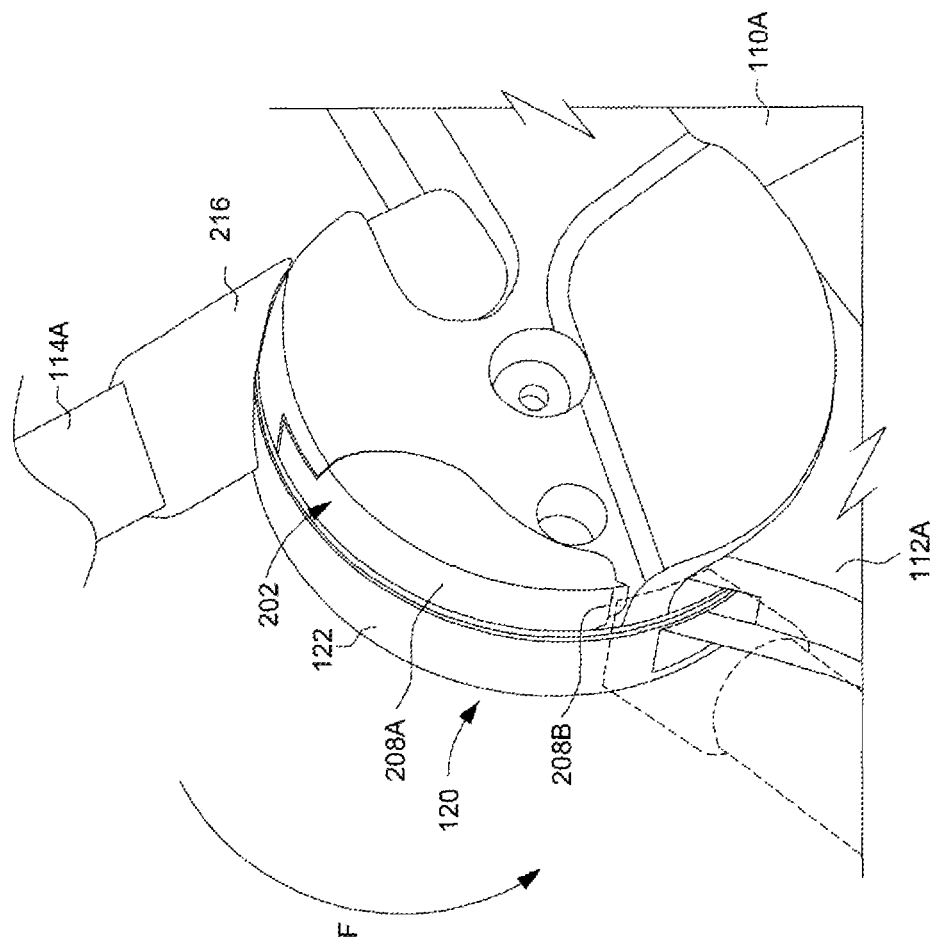
FIGS. 7 and 8 are schematic views illustrating an embodiment of a separate storage lock implemented in the joint structure of the child stroller apparatus.
Figure 8:
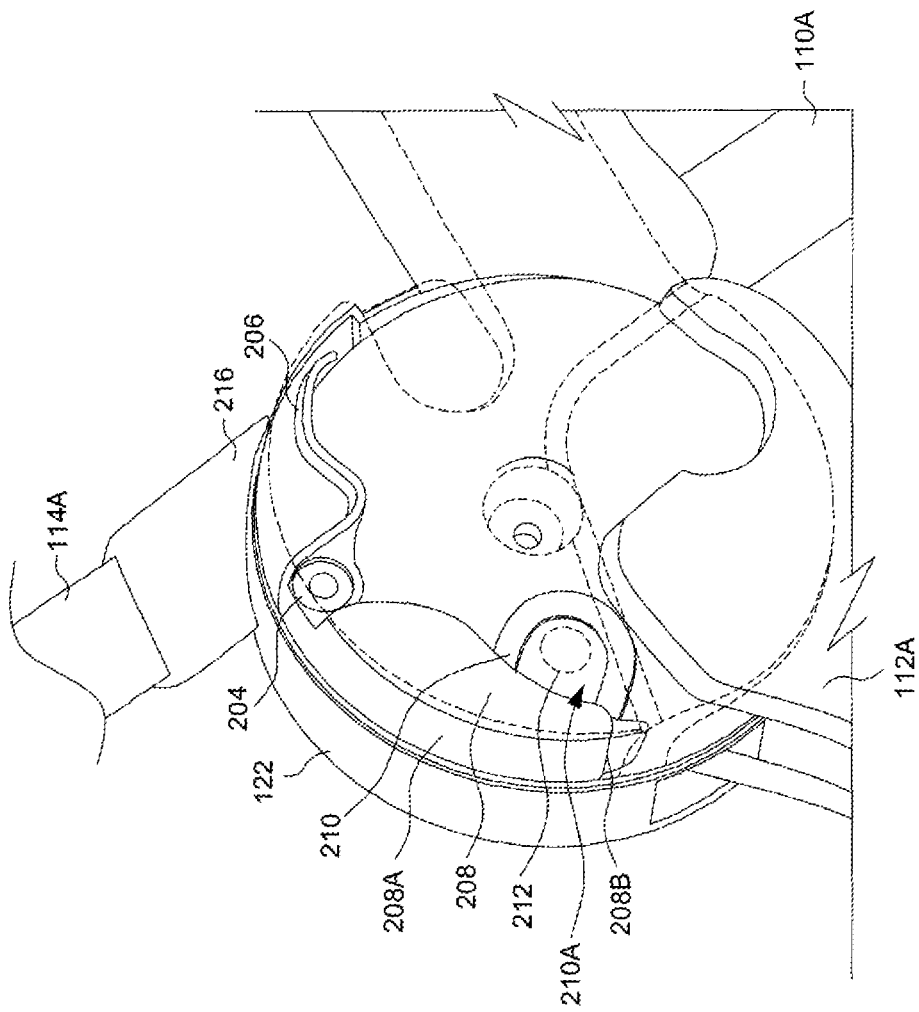

FIGS. 7 and 8 are a schematic view illustrating an embodiment of a storage lock 202 suitable for locking the stroller apparatus 100 in a collapsed state. For clarity, a portion of the housing 122 is shown with dotted lines to better illustrate certain portions of the storage lock 202 that are received in the joint structure 120. The storage lock 202 can include a mount portion 204, a spring 206 joined with a first side of the mount portion 204, a pad 208 joined with a second side of the mount portion 204 opposite to the side of the spring 206, and a stop tongue 210 including an opening 210A and located eccentric from the mount portion 204. In one embodiment, the storage lock 202, including mount portion 204, the spring 206, the pad 208 and the stop tongue 210, can be formed integrally in a single piece made by plastics.

The storage lock 202 can be pivotally connected with the housing 122 at the mount portion 204, such that a distal end of the spring 206 rests in contact against an inner sidewall provided in the housing 122. Moreover, the stop tongue 210 can interfere with an anchor element 212 protruding in the interior of the housing 122 (e.g., the anchor element 212 may extend through the opening 210A) so as to limit the range of rotational displacement of the lock 202. The pad 208 can have an outer surface 208A that substantially matches the curved contour of the housing 122 and is exposed outside the housing 122. A distal end of the pad 208 distant from the mount portion 204 can form an abutment surface 208B adapted to contact with an end portion 216 of the side segment 114A of the handle 114. Provided with the storage lock 202, the stop 168 described previously (shown in FIG. 3) can be omitted from the third coupling element 136.

When the support frame 102 is in the deployed state (shown with solid lines in FIG. 7), the end portion 216 of the side segment 114A of the handle 114 is located in front of the lock 202. Moreover, the spring 206 can bias the lock 202 to an outmost position.

As the handle 114 is folding in the direction F toward the collapsed state (shown with dotted lines in FIG. 7), an end portion 216 of the side segment 114A can push on the outer surface 208A of the pad 208 as the end portion 216 passes over it. As a result, the storage lock 202 (in particular the pad 208) rotates inward, which loads the spring 206. Once the end portion 216 of the side segment 114A has gone past the outer surface 208A of the pad 208, the spring 206 can urge the lock 202 to recover its initial outmost position. As a result, the abutment surface 208B can be shifted to a position that interferes with an edge of the end portion 216, which can block reverse rotation of the handle 114 toward the deployed state. Accordingly, the handle 114, and the first and second leg frame 110 and 112 can be locked in the collapsed state for secure storage.

When the support frame 102 is to be unfolded, a pressing action can be applied on the pad 208 so as to clear the interference created by the abutment surface 208B. The handle 114 then can be rotated to unfold the support frame 102 to the deployed state.

Figure 9:
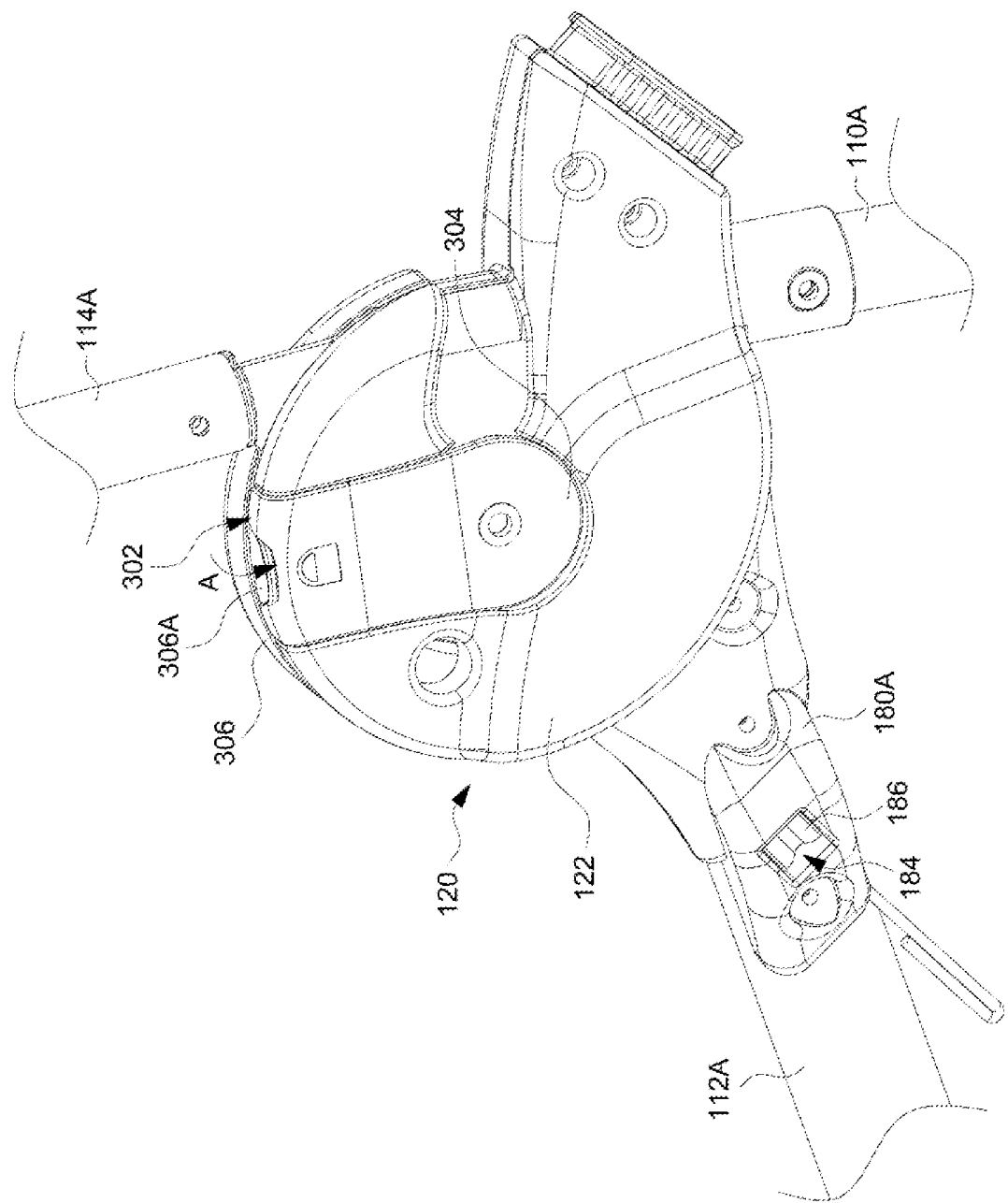
FIGS. 9-12 are schematic views illustrating another embodiment of a separate storage lock implemented in the joint structure of the child stroller apparatus.
Figure 10:
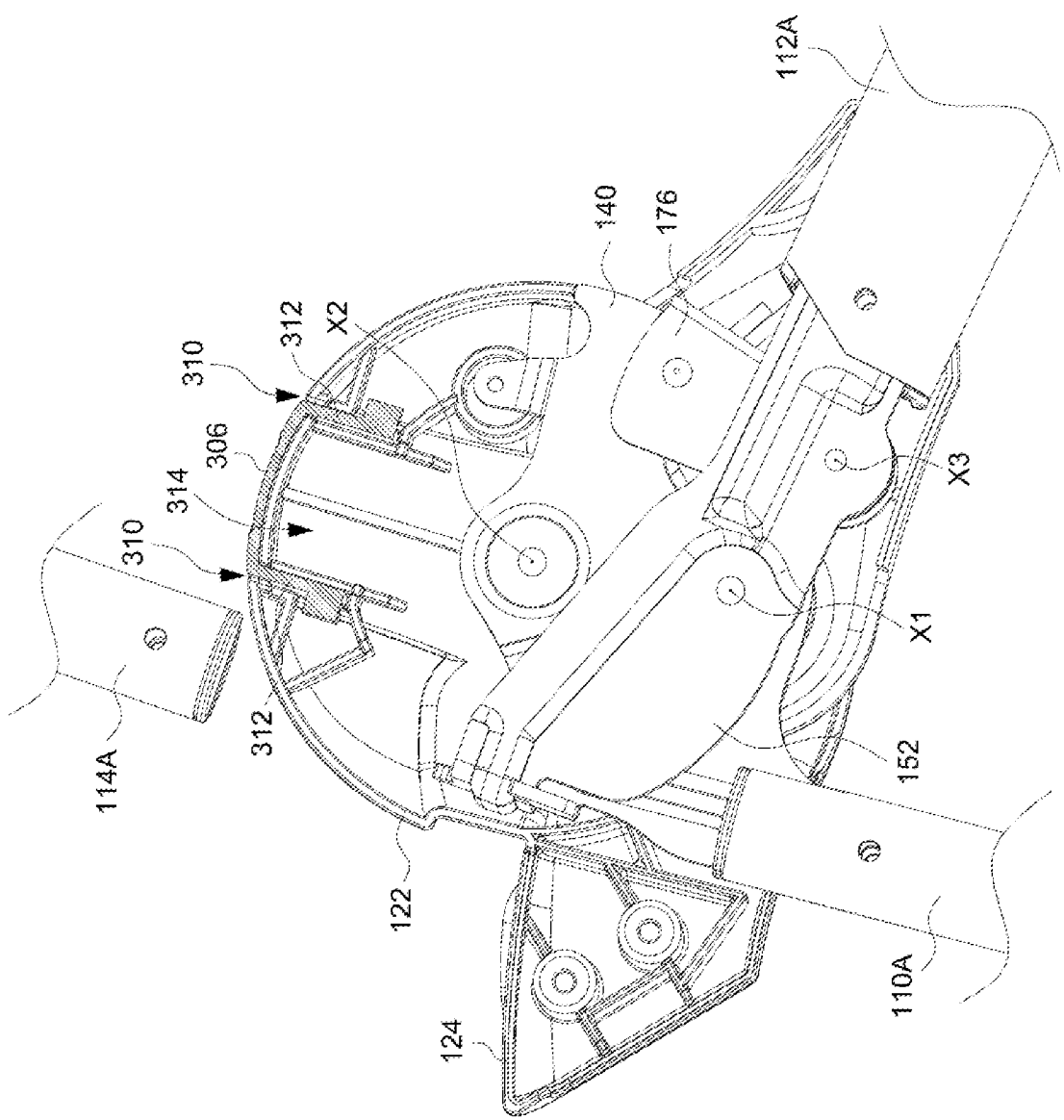
Figure 11:
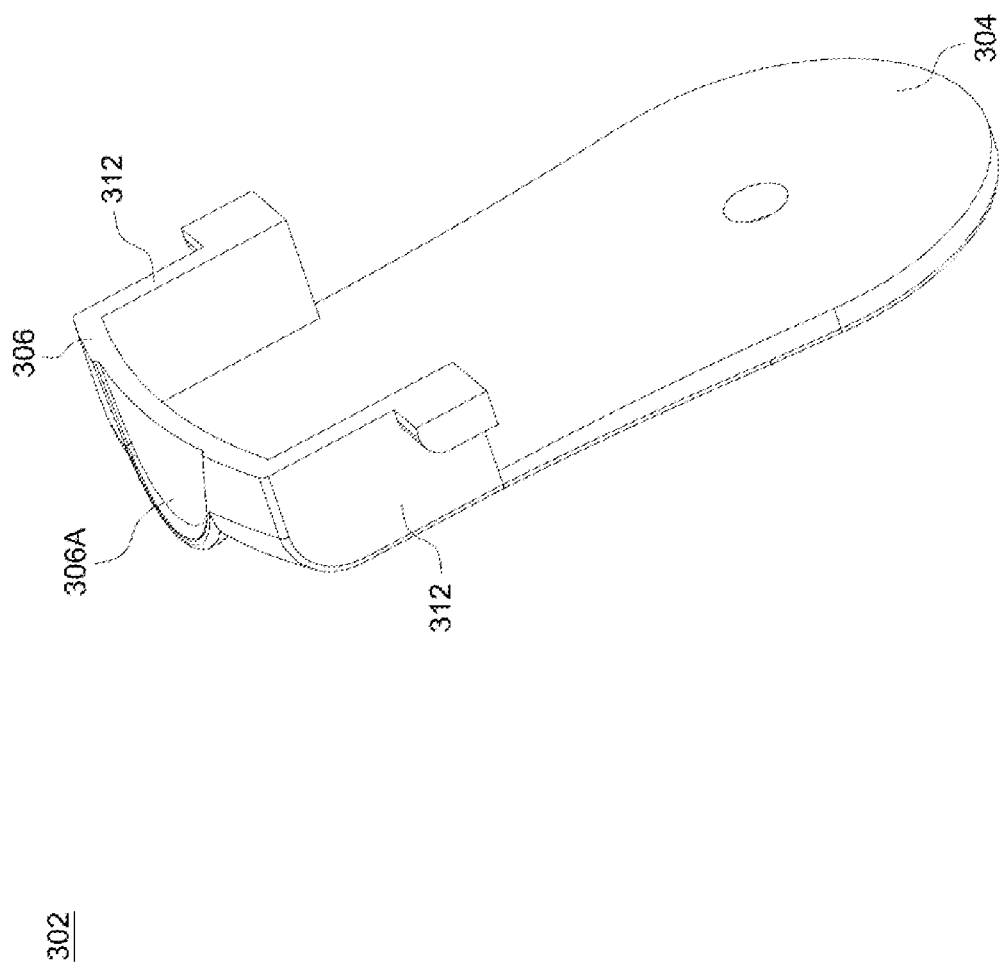

It will be understood that other types of lock construction may also be suitable. FIGS. 9-12 are schematic views illustrating another embodiment of a storage lock 302 that can be made of a resilient material and is securely fixed with an inner side of the housing 122 that is proximate to the third coupling element 136. More specifically, FIG. 9 is a schematic view illustrating the assembly of the lock 302 on the housing 122 viewed from an outer side of the housing 122, FIG. 10 is a schematic view illustrating the assembly of the lock 302 with the housing 122 viewed from an inner side of the housing 122, and FIG. 11 is a schematic view of the lock 302. For clarity, the third coupling element 136 is not shown in FIG. 10 to more clearly show the assembly of the lock 302 from the interior of the housing 122. As shown, the lock 302 can be formed integrally in a single body made of a resilient material, and having a generally elongated shape. The lock 302 can have an end portion 304 fixedly mounted with a central region of the housing 122. In addition, the lock 302 can have a holder portion 306 that is exposed outside the housing 122 and is located adjacent to a peripheral region of the cylindrical portion of the housing 122. The holder portion 306 can include a grip portion 306A for facilitating actuation of the lock 302.

Referring to FIG. 10, two slits 310 may be formed through the outer surface of the housing 122 and communicate with the hollow interior of the housing 122 where the coupling elements 132, 134 and 136 are received. An inner side of the holder portion 306 can include two protruding ribs 312 that are spaced apart from each other and can be mounted through the two slits 310. The ribs 312 can protrude through the two slits 310 toward the interior of the housing 122 so as to be adjacent to the plate portion 162. A restricting cavity 314 can be thereby defined between the ribs 312 in the interior of the housing 122, at a position radially eccentric relative to the pivot axis X2 of the handle 114.

Figure 12:
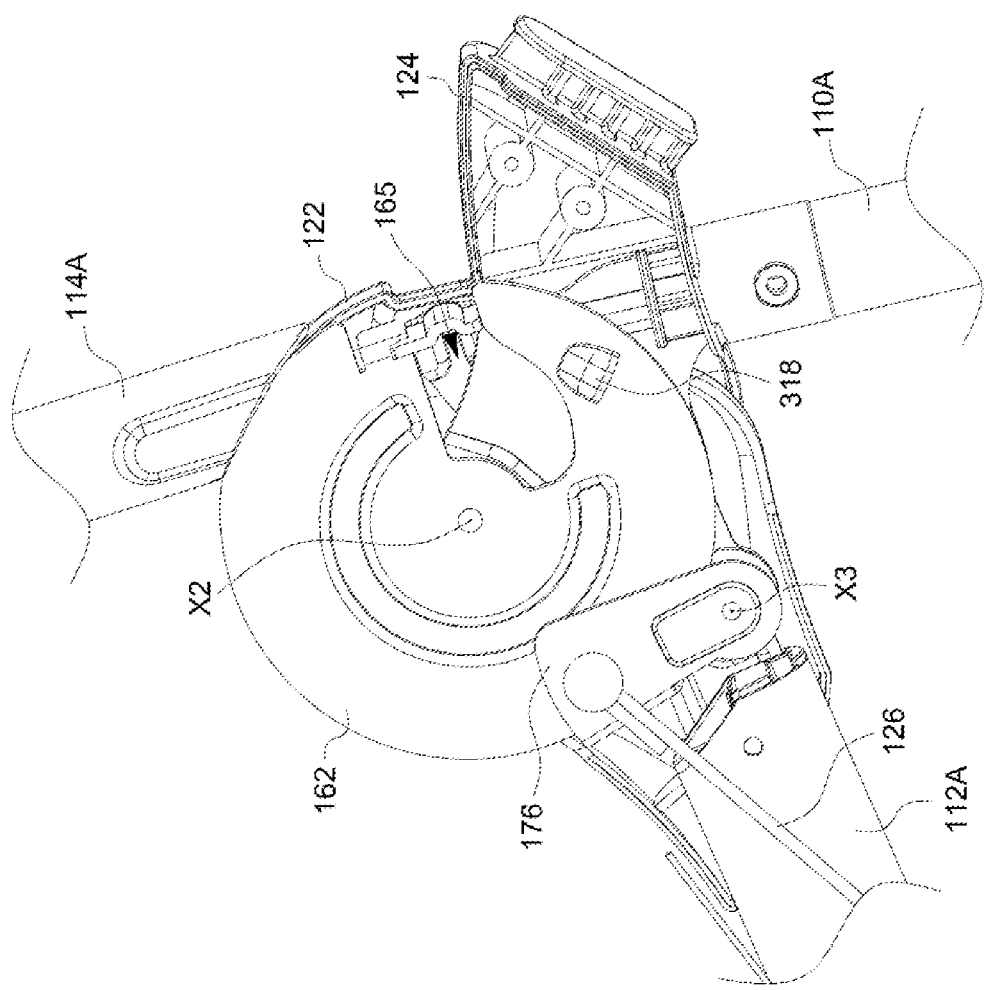

FIG. 12 is a schematic view illustrating a side of the plate portion 162 that adjacently faces the ribs 312 of the holder portion 306. As shown, the plate portion 162 can include a protrusion 318 radially spaced apart from the pivot axis X2 of the handle 114. When the stroller apparatus is in the deployed state (i.e., corresponding to the representation of FIGS. 9, 10 and 12), the protrusion 318 can located at a position spaced apart from and outside the restricting cavity 314. Once the stroller apparatus is folded to the collapsed state, the protrusion 318 can be rotated to a position that engaged in the restricting cavity 314 between the ribs 312 of the holder portion 306. Through the construction of the ribs 312, the holder portion 306 can create an interference that can keep the handle 114 in the collapsed state. To unlock the lock 302, the holder portion 306 of the lock 302 can be elastically deflected laterally outward (in the direction of arrow A) so as to remove the interference created by the ribs 312 and disengage the holder portion 306 from the protrusion 318. Then the handle 114 can be rotated toward the deployed state, which causes the protrusion 318 to rotate away from the holder portion 306.

At least one advantage of the structures described herein is the ability to conveniently collapse the stroller apparatus with one hand. The collapsed stroller apparatus can stand upright on a ground surface, and conveniently carried by gasping the actuator element. In addition, separate storage locks can also be provided to lock the stroller apparatus in the collapsed state for secure storage.

Realizations in accordance with the present invention therefore have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:

1. A child stroller apparatus comprising:
    a first leg frame including a first side segment affixed with a first coupling element, the first coupling element be formed to include a first locking groove;
    a second leg frame including a second side segment affixed with a second coupling element that is pivotally connected with the first coupling element about a first pivot axis;
    a handle including a third side segment affixed with a third coupling element that is pivotally connected with the first coupling element about a second pivot axis spaced apart from the first pivot axis, the third coupling element being formed to include a second locking groove, the first and second locking grooves being radially apart from the second pivot axis; and
    a latch element pivotally connected with the second coupling element, wherein the latch element is movable between a locked position where the latch element locks the first, second and third coupling elements together to hold the handle and the first and second leg frames in a deployed state, and an unlocked position to allow rotation of the second leg frame about the first pivot axis relative to the first leg frame, and rotation of the handle about the second pivot axis relative to the first leg frame to turn the child stroller apparatus to a collapsed state, the latch element when in the locked position being engaged with the first and second locking grooves, and the latch element when in the unlocked position being disengaged from the first and second locking grooves.

2. The child stroller apparatus according to claim 1, wherein the first and second locking grooves when engaged with the latch element are radially aligned with each other relative to the second pivot axis.

3. The child stroller apparatus according to claim 1, wherein the latch element is biased by a spring force toward a locking position engaged with the first and second locking grooves.

4. The child stroller apparatus according to claim 1, wherein the latch element is connected with an actuator element that extends across a width of the stroller apparatus adjacent to a seat of the stroller apparatus.

5. The child stroller apparatus according to claim 4, wherein the actuator element is pulled upward to unlock the latch element and raise the child stroller apparatus above a ground surface, whereby the handle and the first and second leg frames fold over one another by gravity action.

6. The child stroller apparatus according to claim 4, wherein the actuator element is made of a flexible material.

7. The child stroller apparatus according to claim 4, wherein the second leg frame is mounted with a pulley at a position below a support surface of the seat, and the actuator element extends downward from the latch element, wraps around the pulley and then extends across the width of the stroller apparatus.

8. The child stroller apparatus according to claim 1, wherein the third coupling element includes a stop spaced apart from the second locking groove, and the latch element is further operable to engage with the stop to hold the child stroller apparatus in the collapsed state.

9. The child stroller apparatus according to claim 1, wherein the first, second and third coupling elements respectively includes a first, a second and a third tab, and when the child stroller apparatus is in the deployed state, the second tab is located between and in contact with the first and third tabs.

10. The child stroller apparatus according to claim 9, wherein the third coupling element includes a slot having a cam surface, and the second tab is guided in contact with the cam surface to travel through the slot when the handle and the second leg frame rotate relative to each other, whereby rotational displacements of the handle and the second leg frames are linked with each other.

11. The child stroller apparatus according to claim 1, wherein the first and second coupling elements are assembled with each other via a first pivot connection that defines the first pivot axis, the first and third coupling elements are assembled with each other via a second pivot connection that defines the second pivot axis, and the latch element and the first and second pivot connections are enclosed at least partially in a housing.

12. The child stroller apparatus according to claim 1, wherein the first, second and third coupling elements include plate portions that are assembled adjacent to one another, the first coupling element being disposed between the second and third coupling elements.

13. The child stroller apparatus according to claim 1, wherein the first leg frame is a front leg frame, and the second leg frame is a rear leg frame.

14. The child stroller apparatus according to claim 1, further comprising:
    a housing adapted to enclose at least partially the latch element, and two pivot connections that define the first and second pivot axes between the first coupling element and the second and third coupling elements; and
    a lock assembled with the housing, the lock being operable to create an interference that blocks the stroller apparatus from unfolding from the collapsed state to the deployed state.

15. The child stroller apparatus according to claim 14, wherein the lock is made of a resilient material.

16. A child stroller apparatus comprising:
    a first leg frame including a first side segment affixed with a first coupling element;
    a second leg frame including a second side segment affixed with a second coupling element, the second coupling element being assembled with the first coupling element via a first pivot connection that defines a first pivot axis, the first and second leg frames defining a left and a right side of the child stroller apparatus;
    a handle including a third side segment affixed with a third coupling element, the third coupling element being assembled with the first coupling element via a second pivot connection that defines a second pivot axis spaced apart from the first pivot axis, wherein an assembly of the first, second and third coupling elements is such that rotational displacements of the handle and the second leg frame are linked with each other;

a latch element pivotally assembled with the second coupling element about a third pivot axis, the first, second and third pivot axes being spaced apart from one another and extending transversally from the left side to the right side, and the latch element being operable to engage with the first and third coupling elements to lock the handle and the first and second leg frames in a deployed state; and a housing at least partially enclosing the latch element, and the first and second pivot connections.

17. The child stroller apparatus according to claim 16, wherein the first, second and third coupling elements respectively include a first, second and third tab, the third coupling element further includes a slot having a cam surface, and the second tab is guided in contact with the cam surface to travel through the slot when the handle and the second leg frame rotate relative to each other.

18. The child stroller apparatus according to claim 17, wherein when the child stroller apparatus is in the deployed state, the second tab is located between and in contact with the first and third tabs.

19. The child stroller apparatus according to claim 16, wherein the latch element is pivotally connected with the second leg frame, and is operable to engage with plate portions of the first and third coupling elements to lock the deployed state.

20. A child stroller apparatus comprising:

a front leg frame having a first locking groove;

a rear leg frame assembled with the front leg frame via a first pivot connection, the rear leg frame being thereby rotatable relative to the front leg frame about a first pivot axis, the front and leg frames defining a left and a right side of the child stroller apparatus;

a handle having a second locking groove and assembled with the rear leg frame via a second pivot connection, the handle being thereby rotatable relative to the rear leg frame about a second pivot axis; and a latch element pivotally mounted with the rear leg frame about a third pivot axis, the first, second and third pivot axes being spaced apart from one another and extending transversally from the left side to the right side of the child stroller apparatus, and the latch element being operable to releasibly engage with the first and second locking grooves so as to hold the child stroller apparatus in a deployed state.

21. The child stroller apparatus according to claim 20, further including a housing that encloses at least partially the latch element, and the first and second pivot connections.

22. The child stroller apparatus according to claim 20, further including a seat, and wherein the rear leg frame is mounted with a pulley at a position below a support surface of the seat, and an actuator element that is connected to the latch element and extends downward from the latch element, wraps around the pulley and then upwardly passes through an opening of the seat.

23. The child stroller apparatus according to claim 1, wherein the latch element is rotatable about a third pivot axis relative to the second coupling element, the first, second and third pivot axes being spaced apart from one another and extending transversally from a left side to a right side of the child stroller apparatus.

24. The child stroller apparatus according to claim 20, wherein the first and second locking grooves when engaged with the latch element are aligned with each other, and the second locking groove rotationally displaces away from the first locking groove when the handle rotates relative to the front leg frame from the deployed state to a collapsed state of the child stroller apparatus.

\* \* \* \* \*